April 2, 1957  J. W. WELLS  2,787,080
SALMON EGG DISPENSER AND APPLICATOR
Filed March 28, 1955
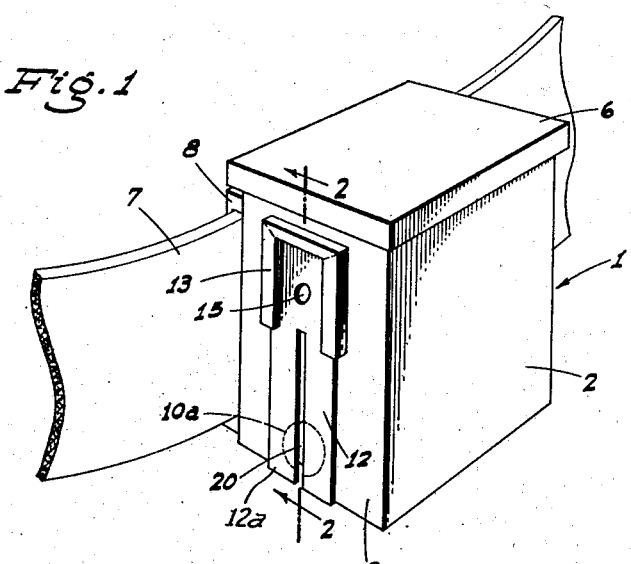
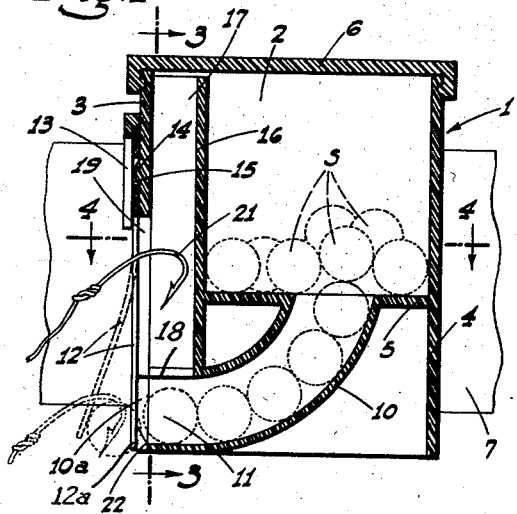
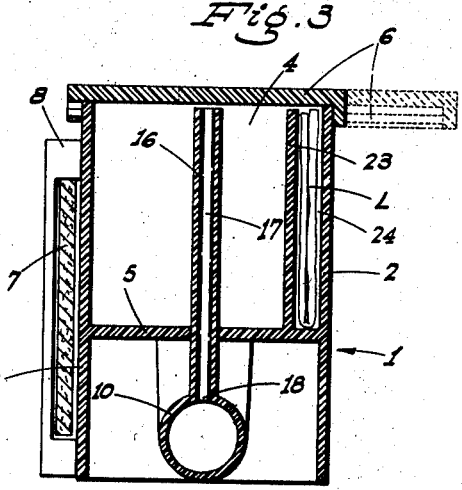
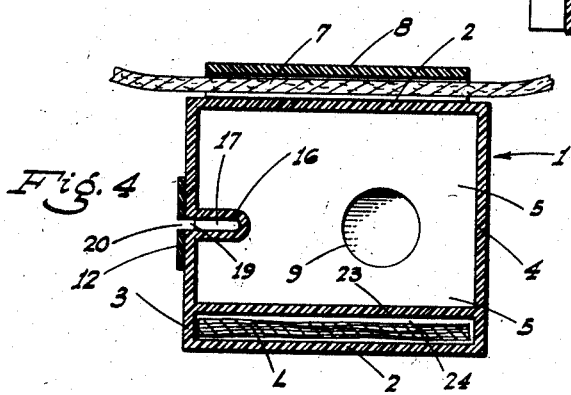
INVENTOR
John W. Wells
BY Webster & Webster
ATTYS.

United States Patent Office 2,787,080
Patented Apr. 2, 1957

2,787,080

SALMON EGG DISPENSER AND APPLICATOR

John W. Wells, Red Bluff, Calif., assignor to Man-Wel, Inc., Red Bluff, Calif., a corporation of California Application March 28, 1955, Serial No. 497,213

8 Claims. (Cl. 43—55)

This invention relates generally to an article of manufacture for use by a fisherman, and particularly for a fisherman using salmon eggs as bait.

The major object of the present invention is to provide a novel dispenser and applicator for salmon eggs; the salmon eggs being carried in a container which is adapted for dispensing the eggs one at a time, and such container including a structure by means of which a hook—grasped by the shank—may be passed into and through a portion of the container whereby to impale and withdraw a single salmon egg.

Another important object of this invention is to provide a salmon egg dispenser and applicator, as above, which is arranged so that each salmon egg, as impaled on the hook and withdrawn from the container is—without more—properly disposed on the hook for fishing use; this wholly avoiding the necessity of manual holding or fumbling with the salmon egg in attempting to pass the hook therethrough.

An additional object of the invention is to provide a salmon egg dispenser and applicator which makes possible the engagement of a salmon egg on a hook quickly with a minimum of effort and without the necessity of the fisherman opening the container, with the attendant chance of spilling other eggs therefrom.

A further object of the invention is to provide a salmon egg dispenser and applicator which is adapted to be supported from the trouser belt of the fisherman, whereby the container is maintained against accidental loss and is always supported in a position readily accessible for use.

A separate object of the invention is to provide a salmon egg dispenser and applicator which is designed for ease and economy of manufacture; the device being light in weight, durable, and preferably—though not necessarily—constructed of a plastic material.

These objects are accomplished by means of such structure and relative arrangement of parts as will fully appear by a perusal of the following specification and claims.

In the drawings:

Fig. 1 is a perspective view of the novel salmon egg dispenser and applicator in place on a belt.

Fig. 2 is a vertical, longitudinal sectional elevation taken on line 2—2 of Fig. 1.

Fig. 3 is a vertical transverse sectional elevation taken on line 3—3 of Fig. 2.

Fig. 4 is a sectional plan view taken on line 4—4 of Fig. 2.

Referring now more particularly to the drawings, and to the characters of reference marked thereon, the novel salmon egg dispenser and applicator comprises an upstanding rectangular container, indicated generally at 1, of relatively small size but of sufficient capacity to contain a substantial quantity of salmon eggs S intended for use as bait.

The container 1 comprises sides 2, a front 3, a back 4, a bottom 5 disposed above the lower end of the container, and a slide type top 6. The top 6 is normally closed but can be removed, for filling the container 1, be merely sliding such top 6 transversely in a direction away from the trouser belt 7, from which the container 1 is supported by means of a belt loop 8 affixed to one side thereof.

The container 1 as supported from the trouser belt 7 by the belt loop 8 is disposed so that the front 3 faces forwardly when said container is disposed at one side of the fisherman.

The bottom 5 of container 1 is formed with a circular opening 9 through which the eggs feed one at a time into a downwardly and forwardly curved feed tube 10; the eggs being received in such tube in single-file order.

The feed tube 10 opens at its forward end through an opening 10a in the front 3, and immediately adjacent such end defines a circular egg receiving pocket 11 adapted to receive a single salmon egg S, as shown in Fig. 2; such tube slightly increasing in diameter from pocket 11 to opening 9.

In order to normally maintain the single salmon egg against escape from the pocket 11, which pocket opens through the front 3 as aforesaid, a flat spring finger 12 is disposed vertically against the front 3, with the free lower end portion 12a of such finger overlying the initially open outer end of the pocket 11; said pocket, together with such finger, being disposed centrally between the sides 2 of the container 1.

The flat spring finger 12 is vertically elongated, although it is rectangular in face elevation; the upper end portion of said finger being removably engaged in an inverted U-shaped retainer frame 13 fixed to the front 3 above but in symmetrical relation to the pocket 11. The retainer frame 13 is internally grooved, as shown, to receive the rectangular upper end portion of the flat spring finger 12 in locating relation. The finger 12 is normally releasably maintained in the retainer frame 13 by means of a forwardly projecting nub 14 on the front 3 which snap-engages in an opening 15 formed in the upper end portion of said finger 12.

Within the container 1 there is a vertical rib 16 formed on the inner face of the front 3; such rib extending from adjacent the top of the container downwardly, through bottom 5, to the pocket forming end portion of tube 10 and with which said rib merges in integral relation.

The rib 16 is formed with a vertical channel 17 therein, which channel opens at its lower end, as at 18, into the pocket 11.

The front 3 is vertically slotted, as at 19, in communication with the channel 17 beginning at a point a substantial distance above the pocket 11; i. e., adjacent the lower end of the retainer frame 13. The vertical slot 19 opens at its lower end into the pocket 11 just as does the channel 17, as aforesaid.

The flat spring finger 12 is similarly vertically slotted, as at 20; such slot not only registering with the slot 19 in front 3 and the channel 17 in rib 16, but additionally extending downwardly to, and being open at, the lower end portion 12a of said finger 12.

In use of the above described salmon egg dispenser it is supported from the trouser belt 7 in the position described; the salmon eggs S in the container 1 being jounced about sufficiently as the fisherman walks to assure that such eggs feed, by gravity, through opening 9 into tube 10, in single file, with the lead egg always in the pocket 11 ready for dispensing, but being prevented from accidental escape from such pocket by the lower end portion of the spring finger 12.

When the fisherman desires to use the salmon egg which rests in the pocket 11, he grasps the shank of the fishing hook 21 and passes such hook, with it pointing downwardly, through the slots 20 and 19, and into the channel 17 in position above the pocket 11. The hook is then manually lowered, passing into the pocket 11 to impale the salmon egg therein on such hook. The channeled rib 16 not only guides the hook but prevents the hook from engaging any egg in the container above bottom 5.

After the salmon egg is so impaled on the hook, the latter is pulled forwardly, drawing such egg out of the pocket 11 against the resistance of finger 12; the latter being sprung outwardly to permit of escape of the salmon egg in the manner shown in dotted lines in Fig. 2.

As so impaled on the hook the salmon egg is ready for use without such egg having been touched by the fisherman. Not only does the salmon egg dispenser and applicator make possible the impaling of a salmon egg on a hook without manually grasping such egg, but the result can be obtained readily and quickly without having to open the container 1 or to conduct any manipulations other than the simple down-sweeping of the hook in the slotted and channeled portions of the container and finger, as hereinbefore described.

After each salmon egg has been impaled on the hook and withdrawn, another salmon egg—under the jostling of the container 1 as the fisherman walks—will advance into the pocket 11 ready for use.

The lower portion of the feed tube 10 is cut away or notched at its forward end, as at 22; the purpose being to permit the fisherman to finger-engage the lower end of the finger 12 and to manually spring it outwardly for the purpose of manually removing an egg from the dispenser other than by hook-impaling.

The container 1 is formed therein with an upstanding partition 23 which extends upwardly from the bottom 5 adjacent but spaced from the outer side 2; such partition merging at corresponding ends with the front 3 and back 4, and terminating at its upper edge close to the top 6. The partition 23 thus defines a relatively narrow compartment 24 adapted for the reception of the fisherman's license L.

From the foregoing description it will be readily seen that there has been produced such an article of manufacture as substantially fulfills the objects of the invention, as set forth herein.

While this specification sets forth in detail the present and preferred construction of the article of manufacture, still in practice such deviations therefrom may be resorted to as do not form a departure from the spirit of the invention, as defined by the appended claims.

Having thus described the invention, the following is claimed as new and useful and upon which Letters Patent are desired:

1. A salmon egg dispenser and applicator comprising a container for a quantity of such eggs, means forming a pocket in association with the container to receive one egg at a time from such quantity, the pocket having an opening from the container for dispensing the egg therefrom, the container including a wall in which said opening is disposed, and yieldable closure means comprising an outwardly yieldable spring member secured exteriorly to said wall and overlying the opening and cooperating therewith to prevent escape of said egg from the pocket; the container, including the pocket forming means, being arranged to permit a manually shank-engaged fish hook to be swept into the pocket from exteriorly of the container to impale said egg on the hook and to withdraw the hook and impaled egg out of the pocket through such opening, with resultant yielding of said closure means; and in which arrangement said wall and spring member are slotted in register, the slot in the wall opening at one end to said pocket, and the slot in the spring member being open to one end thereof; the hook being passed through said registering slots and thence so swept.

2. A salmon egg dispenser and applicator comprising a container for a quantity of such eggs; the container including a bottom and a wall depending therebelow, the wall having an egg dispensing opening therethrough, a tube adapted to feed eggs in single file from the bottom of the container to said opening, said tube defining a pocket immediately adjacent said opening, and an outwardly yieldable closure means secured on the wall and overlying the opening therein; the lead egg of said single file thereof resting in the pocket, and the wall and said closure means having registering slots to permit a manually shank-engaged fish hook to be swept into the pocket from exteriorly of the wall to impale said lead egg on the hook and to withdraw the hook and impaled egg from said pocket and out of the container, with resulting yielding of said closure means.

3. A salmon egg dispenser and applicator, as in claim 2, in which the lower part of the feed tube, immediately adjacent said opening, is cut away at the bottom; the yieldable closure means including a spring finger having a free end terminating at said cut-away part of the feed tube.

4. A salmon egg dispenser and applicator comprising an upstanding container for a quantity of such eggs, the container including a bottom and a wall depending therebelow, the bottom having an opening therein, the depending portion of the wall having an opening therein, an egg feeding tube extending between said openings, said tube being adapted to receive eggs from the container in single file, the portion of the tube immediately adjacent the wall opening defining a pocket in which the lead egg of said single file rests, and a spring finger secured on the outside of the wall and overlying said opening therein; the wall and spring finger having slots therethrough in register, the slot in the wall opening at one end through the tube and into the pocket, and the slot in the spring finger opening to a free end portion thereof, said free end portion of the finger overlying said wall opening, all whereby to permit a manually shank engaged hook to be passed through the slots from exteriorly of the container and swept into the pocket to impale the egg therein on the hook and to withdraw the hook and impaled egg out of the pocket through such wall opening; with resultant outward yielding of said spring finger and escape of the hook from the open end of the slot in said finger.

5. A salmon egg dispenser and applicator, as in claim 4, including a rib in the container on the inner face of said wall, the rib extending lengthwise of the slot in the wall and having a channel in register with said wall slot; and one end of said channeled rib extending to and communicating with the pocket forming portion of the tube.

6. A salmon egg dispenser and applicator comprising an upstanding container for a quantity of such eggs, the container including a bottom and a wall depending therebelow, the bottom having an opening therein, an opening in the depending portion of the wall, an egg feeding tube extending between said openings, said tube being adapted to receive eggs from the container in single file, the portion of the tube immediately adjacent the wall opening defining a pocket in which the lead egg of said single file rests, means on the wall defining a vertical passage in communication with and extending upwardly from the pocket, said passage including a vertical slot through the wall, and a spring finger attached exteriorly to the wall and extending downwardly in normally covering relation to the opening; said finger being vertically slotted in register with the wall slot, and the slot in the finger opening to its lower end.

7. A salmon egg dispenser and applicator, as in claim 6, in which said passage forming means includes a channeled rib on the inner face of the wall.

8. A device, as in claim 4, in which the depth of the wall slot is arranged so that a hook inserted in the slot is limited in its inserting movement to an extent sufficient to prevent engagement of the hook with other than said lead egg.

(References on following page)

References Cited in the file of this patent

UNITED STATES PATENTS

| | | |
|---|---|---|
| 466,928 | Graves | Jan. 12, 1892 |
| 874,278 | Adams | Dec. 17, 1907 |
| 1,185,831 | Rizzotto | June 6, 1916 |
| 1,517,952 | Capparella | Dec. 2, 1924 |
| 1,578,640 | Bunn | Mar. 30, 1926 |
| 1,617,994 | Eaton | Feb. 15, 1927 |
| 1,778,952 | McCullough | Oct. 21, 1930 |
| 1,896,430 | Stanawitz | Feb. 7, 1933 |
| 2,160,436 | Jones | May 30, 1939 |
| 2,502,816 | Bennek | Apr. 4, 1950 |
| 2,511,828 | Andrist | June 20, 1950 |
| 2,518,590 | Andrist | Aug. 15, 1950 |
| 2,681,529 | Braithwaite | June 22, 1954 |

FOREIGN PATENTS

| | | |
|---|---|---|
| 460,460 | Great Britain | Jan. 28, 1937 |